(12) United States Patent
Ballu

(10) Patent No.: US 7,946,511 B2
(45) Date of Patent: May 24, 2011

(54) APPLIANCE FOR MANUAL AND LOCALIZED SPRAYING

(75) Inventor: Patrick Ballu, Reims (FR)

(73) Assignee: Exel Industries, Epernay (FR)

( * ) Notice: Subject to any disclaimer, the term of this patent is extended or adjusted under 35 U.S.C. 154(b) by 179 days.

(21) Appl. No.: 12/308,892

(22) PCT Filed: Jun. 29, 2007

(86) PCT No.: PCT/FR2007/001108
§ 371 (c)(1),
(2), (4) Date: Dec. 29, 2008

(87) PCT Pub. No.: WO2008/000970
PCT Pub. Date: Jan. 3, 2008

(65) Prior Publication Data
US 2010/0044469 A1 Feb. 25, 2010

(30) Foreign Application Priority Data
Jun. 30, 2006 (FR) ...................... 06 52748

(51) Int. Cl.
*A01G 25/14* (2006.01)
*B05B 15/06* (2006.01)
(52) U.S. Cl. ........ 239/375; 239/525; 239/532; 239/584; 239/337; 239/325; 141/48; 141/49; 111/7.2
(58) Field of Classification Search ............. 239/375, 239/525, 532; 41/48.5, 49; 111/7.1–7.4
See application file for complete search history.

(56) References Cited

U.S. PATENT DOCUMENTS

| | | | | | |
|---|---|---|---|---|---|
| 1,135,346 | A | * | 4/1915 | Barnhart | 111/7.3 |
| 1,772,763 | A | * | 8/1930 | Van Riper | 111/7.3 |
| 1,868,235 | A | * | 7/1932 | Jaden | 111/7.3 |
| 2,209,731 | A | * | 7/1940 | Holmes | 111/7.3 |
| 2,323,773 | A | * | 7/1943 | Irish | 111/7.1 |
| 2,577,687 | A | * | 12/1951 | Lee | 222/449 |
| 2,841,923 | A | * | 7/1958 | Dickison | 47/1.01 R |
| 2,867,943 | A | * | 1/1959 | Whitesell | 47/57.5 |
| 3,346,194 | A | * | 10/1967 | Enblom | 239/333 |
| 3,405,669 | A | * | 10/1968 | Nimrick | 111/7.2 |
| 5,775,595 | A | * | 7/1998 | Knodel et al. | 239/375 |

FOREIGN PATENT DOCUMENTS

| | | |
|---|---|---|
| DE | 831 784 C | 2/1952 |
| EP | 0 084 486 A | 7/1983 |
| FR | EP 0084486 A1 * | 1/1983 |
| FR | 2 623 374 A1 | 5/1989 |

* cited by examiner

*Primary Examiner* — Len Tran
*Assistant Examiner* — James S Hogan
(74) *Attorney, Agent, or Firm* — Dowell & Dowell, PC

(57) ABSTRACT

A manual sprayer for receiving a liquid which includes a gripping knob mounted on one end of a reservoir and a spray assembly mounted in fluid communication on another end of the reservoir, a skirt for supporting the spray assembly against the ground, and a vent for venting the reservoir. The apparatus includes a valve that is actuated by a user gripping the knob and the valve being movable between a closed position preventing communication between the reservoir and the outside and an open position allowing such communication.

25 Claims, 2 Drawing Sheets

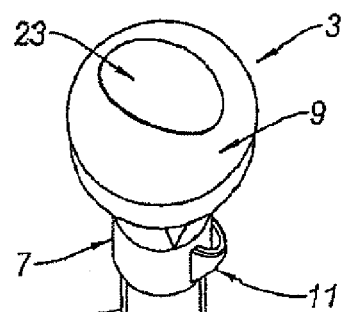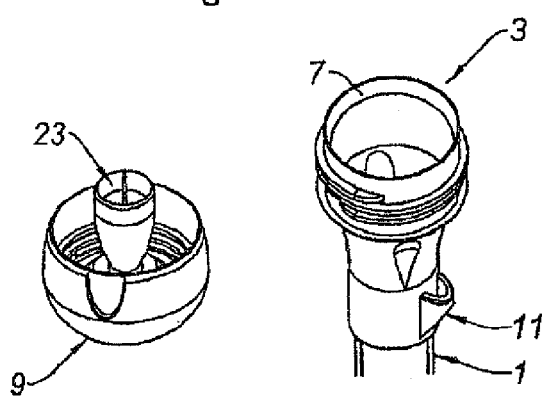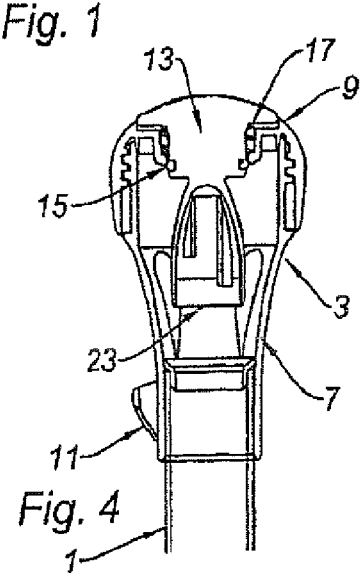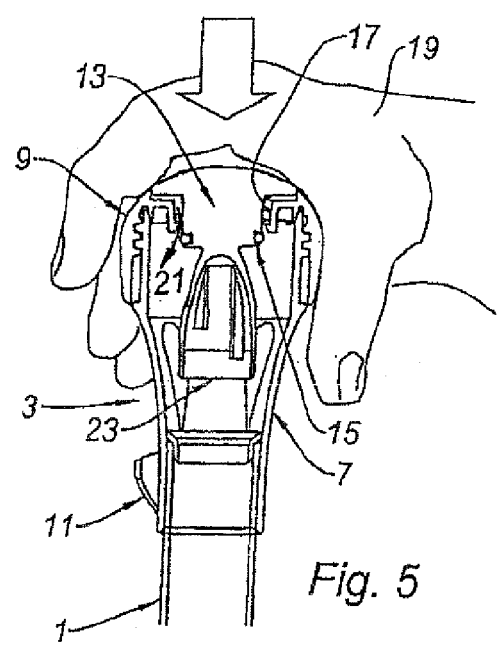
Fig. 1
Fig. 2
Fig. 3
Fig. 4
Fig. 5

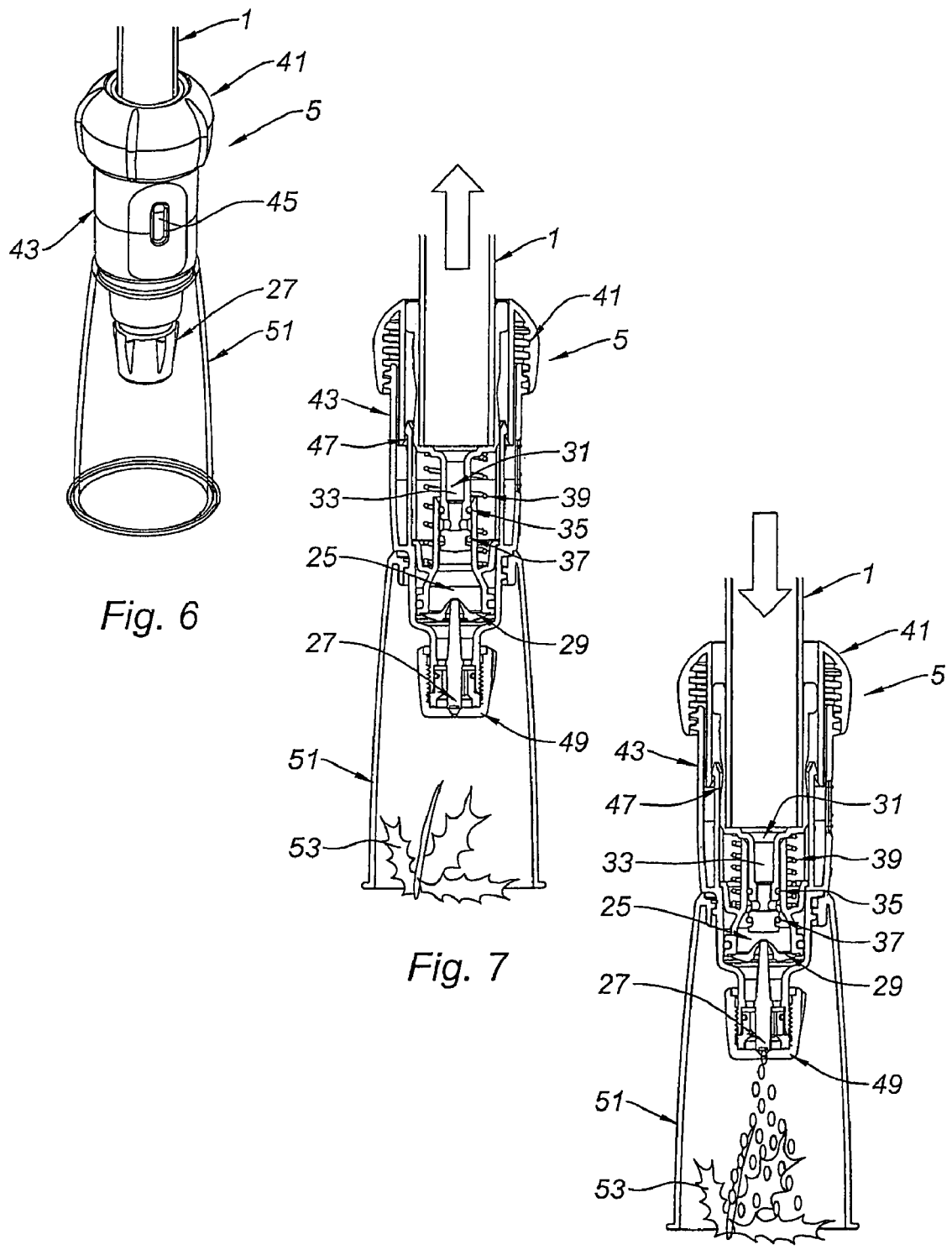

APPLIANCE FOR MANUAL AND LOCALIZED SPRAYING

BACKGROUND OF THE INVENTION

1. Field of the Invention

The present invention relates to an apparatus for manual and localized spraying.

2. Brief Description of the Related Art

Document FR 2 519 844 discloses an apparatus for manual and localized spraying that is in the form of a stick, having a tubular reservoir suitable for being filled with a plant treatment liquid, a gripping knob mounted on one end of the reservoir, a spray assembly mounted in fluid communication on the other end of the reservoir and including spray means, means for supporting said spray assembly on the ground, and vent means for connecting said reservoir to the atmosphere.

In this prior art apparatus, the reservoir venting means comprise an orifice formed in the knob.

The orifice serves to avoid forming suction inside the tubular reservoir, where such suction would impede proper operation of the spraying, given that the treatment liquid passes from the reservoir to the spray assembly merely under gravity.

In addition to the fact that such an orifice runs the risk of being closed by the hand of a user, the treatment liquid runs the risk of escaping via said orifice when the apparatus is positioned horizontally or upside-down, i.e. with the knob at the bottom and the spray assembly at the top.

SUMMARY OF THE INVENTION

A particular object of the present invention is to provide a spray apparatus of the above-mentioned type that does not present the above-mentioned drawbacks.

This object of the invention is achieved with an apparatus for manual and localized spraying, the apparatus comprising a tubular reservoir suitable for receiving a plant treatment liquid, a gripping knob mounted on one end of the reservoir, a spray assembly mounted in fluid communication on the other end of the reservoir and comprising spray means and means for supporting said spray assembly on the ground, and vent means for connecting said reservoir to the atmosphere, the apparatus being remarkable in that said vent means comprise a valve configured to be actuated merely by a user gripping said knob, the valve being movable between a closed position preventing communication between said reservoir and the outside, and an open position allowing said communication, resilient means being provided for urging said valve towards its closed position.

Because of the presence of the flush valve, the reservoir is vented automatically when the user takes hold of the knob and presses down on it to perform spraying operations.

Air can flow all around the periphery of the valve, so there is no longer any risk of the air vent being closed by the user's hand.

In addition, in the event of the spray apparatus being knocked over, the resilient return of the valve towards its closed position guarantees that the treatment liquid situated in the reservoir cannot escape to the outside.

According to other characteristics, that are optional, of the spray apparatus of the invention:

said valve is mounted flush on said knob;
said valve is mounted so as to cover said knob;
the apparatus comprises means for locking said valve in its closed position;
said knob comprises a first portion mounted on said reservoir, and a second portion that can be separated from said first portion;
said valve is mounted in said second portion;
said first portion is funnel-shaped;
said knob includes a fastener eyelet;
said spray assembly comprises a chamber in fluid communication with said spray means, and a piston secured to said reservoir and movable inside said chamber, said piston being adapted to expel the plant treatment liquid that is to be found in said chamber towards said spray means, and then to put said chamber into fluid communication with said reservoir, said apparatus being remarkable in that it comprises a ring for adjusting the stroke of said piston;
said apparatus comprises an adjustment position for said ring in which the stroke of said piston is substantially zero;
said apparatus comprises a window for viewing the adjustment state of said ring;
said apparatus comprises means for preventing said adjustment ring from escaping at the end of the adjustment stroke;
said spray means comprise an adjustable jet nozzle;
said means for supporting comprise a transparent skirt; and
said spray means and said means for supporting comprise a plurality of skirts of different shapes suitable for fitting on a body, and said spray means comprise a set of nozzles suitable for fitting on said body, so as to generate jets of different shapes corresponding to the shapes of said skirts.

BRIEF DESCRIPTION OF THE DRAWINGS

Other characteristics and advantages of the present invention appear in the light of the following description and on examining the accompanying drawings, in which:

FIG. 1 is an elevation view of a spray apparatus according to the present invention;

FIG. 2 is a perspective view of the knob of this apparatus;

FIG. 3 is a perspective view of two portions making up the knob, the two portions being shown separated from each other;

FIG. 4 is an axial cross sectional view of the knob in the free state;

FIG. 5 is a view analogous to FIG. 4 showing a user's hand taking hold of the knob;

FIG. 6 is a perspective view of the spray assembly of the apparatus according to the invention;

FIG. 7 is an axial cross sectional view of the spray assembly positioned on a plant to be treated, the assembly being in a free state; and FIG. 8 is a view analogous to FIG. 7 of the spray assembly, with a downward pressure force being exerted on the knob by a user for the purpose of treating said plant.

DESCRIPTION OF THE PREFERRED EMBODIMENTS

Reference is made initially to FIG. 1 where it can be seen that the spray apparatus according to the invention comprises a tubular reservoir 1, preferably transparent and graduated, for receiving a plant treatment liquid.

At its top end, the reservoir carries a gripping knob 3 for holding in the hand.

At its bottom end, the reservoir has a spray assembly 5.

Reference is made to FIGS. 2 to 5 in which the knob 3 is shown in greater detail.

As can be seen in particular in FIG. 3, the knob 3 comprises a first portion 7 mounted on the reservoir 1, and a second portion 9 designed to be screw-fastened on the first portion 7.

As can be seen in particular in FIGS. 4 and 5, the first portion 7 presents a flared shape and includes at its periphery a fastener eyelet 11.

The second portion 9 has a valve 13, or plug or button, mounted flush with said second portion and movable between a closed position visible in FIG. 4 and an open position visible in FIG. 5.

The valve 13 includes at its periphery an O-ring 15 providing a sealed connection between said valve and the second portion 9 when the valve is in the closed position.

Furthermore, resilient means such as a helical spring 17 urge the valve 13 towards its closed position as shown in FIG. 4.

As can be seen in FIG. 5, when a user takes the knob 3 in the hand 19, pressure is spontaneously exerted on the valve 13, thereby moving the O-ring away from its seat and thus allowing air to flow (see arrow 21) between the outside and the inside of the knob 3, which itself is in communication with the inside of the reservoir 1.

It should be observed that it is advantageous to provide a metering cup 23 secured to the valve 13 and disposed in such a manner that when the second portion 9 of the knob is unscrewed from the first portion 7 of the knob (see FIG. 3), this cup can be used for measuring out the plant treatment composition that is to be poured into the tubular reservoir 1.

Reference is made to FIGS. 6 to 8 that show the spray assembly 5 of the apparatus according to the invention.

As can be seen in these figures, the spray assembly includes a chamber 25 in fluid communication with a nozzle 27, an anti-drip valve of elastomer material 29 being interposed between this chamber and this nozzle.

A piston 31 secured to the tubular reservoir 1 is slidably mounted inside the chamber 25. The piston has a hollow portion 33 opening out firstly to the inside of the reservoir 1, and secondly to the periphery of the piston, between a conventional O-ring 35 and a floating O-ring 37.

As explained in document FR 2 519 844, the floating O-ring 37 prevents fluid communication between the chamber 25 and the hollow portion 33 of the piston 31 when the piston is pushed towards the nozzle 27, and allows such fluid communication when the piston moves away from the nozzle.

Resilient means 39, such as a helical spring, urge the piston 31, and thus the tubular reservoir 1, away from the nozzle 27.

The spray assembly 5 also includes an adjustment ring 41 screwed onto the body 43 of the assembly and forming an abutment for the stroke of the assembly comprising the tubular reservoir 1 and the piston 31.

As can be seen in particular in FIG. 6, a window 45 formed in the body 43 makes it possible to see the extent to which the ring 41 is screwed onto the body.

This window may include mentions such as "max" and "min", corresponding respectively to maximum and minimum strokes for the tubular reservoir 1 and the piston 31 inside the body 43, and also a padlock indicating a degree of screw tightening that corresponds to zero stroke for this reservoir and this piston.

It should also be observed that provision can advantageously be made for the ring 41 to have means 47 for snap-fastening with the body 43 so as to prevent the ring from escaping from the body in the fully-unscrewed position.

It is also advantageous to make provision for an adjustment ring 49 on the nozzle 27, for the purpose of modifying the shape of the jet from the nozzle (e.g. straight jet or conical jet).

According to another advantageous characteristic of the apparatus according to the invention, the apparatus may bear against the ground via a skirt 51 made of a transparent material.

Advantageously, skirts of various shapes (oblong, . . . ) may be provided for fitting to the body 43.

Under such circumstances, a set of nozzles is also provided for fitting on the body 43, thereby enabling jets to be delivered that are of different shapes corresponding to the shapes of the skirt.

The ability to use the different combinations of skirts and nozzles makes it possible to treat plants that are distributed differently in position.

By way of example, the combination of an oblong skirt with a nozzle forming a flat jet is particularly well suited to treating weeds growing in a line between paving stones of a terrace.

The operation and the advantages of the apparatus according to the invention stem directly from the above description.

When a user takes hold of the knob 3, in particular presses on the knob so as to perform a spraying operation, the user presses spontaneously on the valve 13, thereby connecting the tubular reservoir 1 to the atmosphere, and thus causing the spray assembly 5 to operate properly.

When the user releases the knob 3, the valve 13 is urged towards its sealed position, thus avoiding any risk of the plant treatment liquid located inside the tubular reservoir 1 spilling to the outside, in particular in the event of the apparatus being knocked over.

The presence of the measuring cup 23 makes it easier to measure out the plant treatment composition that is to be poured into the inside of the tubular reservoir 1.

The flared shape of the first portion 7 of the knob 3 makes it easier to insert the composition into the inside of the reservoir.

The fastener eyelet 11 serves advantageously to fasten the apparatus in a vertical position on a support while it is not in use.

When the user seeks to treat a plant 53 (see FIGS. 7 and 8), the user begins by positioning the skirt 51 around the plant, and then presses the valve 13 downwards.

The tubular reservoir 1 and the piston 31 thus go from the position shown in FIG. 7 to the position shown in FIG. 8, thereby enabling the plant treatment liquid situated inside the chamber 25 to be sent through the nozzle 27 against the valve 29.

The plant treatment liquid situated inside the chamber 25 is thus sprayed onto the plant 53, as shown in FIG. 8.

When the user releases the knob 3, the tubular reservoir 1 and the piston 31 return from the position shown in FIG. 8 to the position shown in FIG. 7, under the effect of the return force exerted by the spring 39.

When this occurs, and because of the presence of the floating sealing ring 37, the liquid situated inside the tubular reservoir 1 flows into the hollow portion 33 of the piston 31 and fills the chamber 25 where it remains until the next spraying operation, the valve 29 preventing the liquid from flowing to the nozzle 27.

By providing a ring 41 to adjust the stroke of the assembly constituted by the tubular reservoir 1 and the piston 31, it is possible to adjust at will the volume of plant treatment liquid that is delivered onto the plant for treatment on each spraying operation.

The ability to block off this stroke completely, thereby preventing the sprayer from operating, serves to provide additional safety, in particular with respect to children.

Having a nozzle 27 with a jet that is adjustable is particularly convenient when it is necessary to treat different kinds of plant, being spread out to a greater or lesser extent on the ground.

Having a simple transparent skirt 51 serves to prevent the sprayed liquid from escaping outside the treatment zone, while nevertheless enabling said zone to be seen clearly by the user.

Naturally, the present invention is not limited in any way to the example described above by way of non-limiting illustration.

Thus, instead of providing a valve that is mounted flush on the knob, it is possible for example to envisage having a valve that covers the knob so that when the user takes hold of the knob that gives rise necessarily to a pressure load on the valve.

It is also possible to envisage providing means for locking the valve in its closed position: for example, it is possible to envisage a bayonet type lock, in which the valve is locked and unlocked by being turned relative to the knob.

The presence of such locking means can serve, for example, to enable a weeding stick to be sold that is prefilled with the treatment liquid without there being any risk of the liquid escaping as a result of an untimely application of load to the valve.

The invention claimed is:

1. An apparatus for manual and localized spraying, said apparatus comprising; a tubular reservoir for receiving a liquid, a gripping knob mounted on one end of said reservoir, a spray assembly mounted in fluid communication on another end of said reservoir and means for supporting said spray assembly on the ground, said spray assembly including a spray means and a chamber in fluid communication with said spray means, a piston secured to said reservoir and movable inside said chamber, said piston being adapted to expel the liquid that is in said chamber towards said spray means, and to communicate said chamber in fluid communication with said reservoir, a ring for adjusting a stroke of said piston (31) and wherein in one position of said ring, a stroke of said piston is substantially zero, vent means for connecting said reservoir to the atmosphere, said vent means including a valve configured to be actuated by a user gripping said knob, said valve being movable between a closed position preventing communication between said reservoir and the outside and an open position allowing said communication, and resilient means being provided for urging said valve towards its closed position.

2. An apparatus according to claim 1, wherein said valve is mounted flush on said knob.

3. An apparatus according to claim 1, wherein said valve is mounted so as to cover said knob.

4. An apparatus according to claim 1, wherein including means for locking said valve in its closed position.

5. An apparatus according to claim 1, wherein said knob includes a first portion mounted on said reservoir, and a second portion that can be separated from said first portion.

6. An apparatus according to claim 5, wherein said valve is mounted in said second portion.

7. An apparatus according to claim 5, wherein said first portion is funnel-shaped.

8. An apparatus according to claim 1, wherein said knob includes a fastener eyelet.

9. An apparatus according to claim 1, including a window for viewing an adjustment state of said ring.

10. An apparatus according to claim 1, including means for preventing said adjustment ring from escaping at the end of the adjustment stroke.

11. An apparatus according to claim 1, wherein said spray means has an adjustable jet nozzle.

12. An apparatus according to claim 1, wherein said means for supporting includes a transparent skirt.

13. An apparatus according to claim 1, wherein said means for supporting includes a plurality of skirts of different shapes suitable for fitting on a body, and said spray means includes a set of nozzles suitable for fitting on said body so as to generate jets of different shapes corresponding to the different shapes of said skirts.

14. An apparatus for manual and localized spraying, said apparatus comprising; a tubular reservoir for receiving a liquid, a gripping knob mounted on one end of said reservoir, a spray assembly mounted in fluid communication on another end of said reservoir and means for supporting said spray assembly on the ground, said spray assembly including a spray means and a chamber in fluid communication with said spray means, a piston secured to said reservoir and movable inside said chamber, said piston being adapted to expel the liquid that is in said chamber towards said spray means, and to place said chamber in fluid communication with said reservoir, a ring for adjusting the stroke of said piston and a window for viewing the adjustment state of said ring, vent means for connecting said reservoir to the atmosphere, said vent means including a valve configured to be actuated by a user gripping said knob said valve being movable between a closed position preventing communication between said reservoir and the outside and an open position allowing said communication, and resilient means being provided for urging said valve towards its closed position.

15. An apparatus according to claim 14, wherein said valve is mounted flush on said knob.

16. An apparatus according to claim 14 wherein said valve is mounted so as to cover said knob.

17. An apparatus according to claim 14, including means for locking said valve in its closed position.

18. An apparatus according to claim 14, wherein said knob includes a first portion mounted on said reservoir, and a second portion that can be separated from said first portion.

19. An apparatus according to claim 18, wherein said valve is mounted in said second portion.

20. An apparatus according to claim 18, wherein said first portion is funnel-shaped.

21. An apparatus according to claim 14, wherein said knob includes a fastener eyelet.

22. An apparatus according to claim 14, including means for preventing said adjustment ring from escaping at the end of the adjustment stroke.

23. An apparatus according to claim 14, wherein said spray means has an adjustable jet nozzle.

24. An apparatus according to claim 14, wherein said means for supporting includes a transparent skirt.

25. An apparatus according to claim 14, wherein said means for supporting includes a plurality of skirts of different shapes suitable for fitting on a body, and said spray means includes a set of nozzles suitable for fitting on said body so as to generate jets of different shapes corresponding to the different shapes of said skirts.

* * * * *